(12) United States Patent
Meng

(10) Patent No.: US 10,268,045 B2
(45) Date of Patent: Apr. 23, 2019

(54) ADJUSTABLE MULTIPLE-RING POLARIZING ND FILTER ASSEMBLY WITH ELASTIC ENGAGING MEMBER FOR AXIAL RING SECUREMENT

(71) Applicant: Tien-Pei Meng, Taipei (TW)

(72) Inventor: Tien-Pei Meng, Taipei (TW)

( * ) Notice: Subject to any disclaimer, the term of this patent is extended or adjusted under 35 U.S.C. 154(b) by 185 days.

(21) Appl. No.: 15/633,888

(22) Filed: Jun. 27, 2017

(65) Prior Publication Data
US 2018/0052332 A1    Feb. 22, 2018

(30) Foreign Application Priority Data
Aug. 17, 2016   (TW) .............................. 105212486 U

(51) Int. Cl.
| G02B 7/02 | (2006.01) |
| G02B 27/28 | (2006.01) |
| G03B 17/56 | (2006.01) |

(52) U.S. Cl.
CPC ......... *G02B 27/281* (2013.01); *G03B 17/565* (2013.01)

(58) Field of Classification Search
CPC ........ G02B 27/281; G02B 7/006; G02B 7/00; G02B 7/003; G02B 7/004; G02B 7/005; G02B 7/02; G02B 7/021; G02B 7/022; G02B 7/023; G02B 7/025; G02B 7/026; G03B 11/00; G03B 17/565
See application file for complete search history.

(56) References Cited

U.S. PATENT DOCUMENTS

| 2006/0098307 A1* | 5/2006 | Campean ................ F41G 1/383 359/819 |
| 2006/0250702 A1* | 11/2006 | Nishimoto ............... G02B 7/10 359/704 |
| 2007/0171548 A1* | 7/2007 | Kulakofsky ............. G02B 7/02 359/808 |
| 2014/0240854 A1* | 8/2014 | Meng ....................... G02B 5/20 359/738 |
| 2014/0240857 A1* | 8/2014 | Meng ....................... G02B 7/02 359/827 |
| 2016/0216474 A1* | 7/2016 | Kobayashi ............. G03B 11/00 |
| 2017/0153408 A1* | 6/2017 | Clark ..................... G02B 7/006 |

* cited by examiner

*Primary Examiner* — William R Alexander
*Assistant Examiner* — Balram T Parbadia
(74) *Attorney, Agent, or Firm* — Bacon & Thomas, PLLC

(57) ABSTRACT

An adjustable multiple-ring polarizing neutral-density filter assembly with an elastic engaging member for axial ring securement includes a fixedly connecting ring and a first pivotally connecting ring. The fixedly connecting ring is mounted with a polarizing lens and has a first end threadedly connectable to a camera lens and an opposite second end axially provided with a receiving groove. The elastic engaging member is mounted in the receiving groove and has a free end extending out of or forced into the receiving groove. The first pivotally connecting ring is mounted with another polarizing lens and has one end pivotally connected to the second end of the fixedly connecting ring and circumferentially provided with an engaging portion. The free end of the elastic engaging member can press against the bottom wall of any of the engaging recesses in the engaging portion to maintain the corresponding light-reducing effect while being shaken.

44 Claims, 9 Drawing Sheets

ADJUSTABLE MULTIPLE-RING POLARIZING ND FILTER ASSEMBLY WITH ELASTIC ENGAGING MEMBER FOR AXIAL RING SECUREMENT

FIELD OF THE INVENTION

The present invention relates to a multiple-ring polarizing neutral-density (ND) filter assembly. More particularly, the invention relates to an adjustable multiple-ring polarizing ND filter assembly with an elastic engaging member for axial ring securement such that not only can the two polarizing lenses in the assembly be rotated with respect to each other as needed to adjust the amount of light reduction with ease, but also the amount of light reduction can be securely fixed at the desired level, thus providing an improvement over the prior art in terms of convenience of use, accuracy, stability, and utility.

BACKGROUND OF THE INVENTION

The rapid development of digital technology has enabled continual betterment of the functionality and performance of digital products, along with a decline in selling prices that has propelled such products into extensive use. Digital still cameras, for example, have the advantageous features of real-time display and digital image storage, allowing users to browse and screen the images taken and process and share the images conveniently. In fact, these advantages have made digital still cameras immensely popular among the general public and a rising star in the consumer electronics market; almost everybody has one nowadays. The boom of the digital still camera market has also brought plenty of business opportunities to the market of camera peripherals.

Generally speaking, one who photographs with a digital still camera would prepare various filters in order to add different effects to the images taken. Some notable examples of photographic filters include soft-focus filters, cross screen filters (or better known as star filters), polarizing filters, neutral-density (ND) filters, and a variety of color filters. Referring to FIG. 1, a filter F can be mounted to the front rim of a camera lens (depicted in the drawing as a camera lens assembly L by way of example) and then mounted to a digital still camera C along with the camera lens assembly L so that images taken with the digital still camera C will have a special effect corresponding to the filter F. While the advancement of image processing software has forced many of the aforementioned filters to give way to the powerful digital technology, polarizing filters and ND filters are still difficult to replace. As its Chinese name (light-reducing lens) suggests, an ND filter is a filter configured for reducing light transmittance, and ND filters come in different specifications each featuring a distinct level of light transmittance. A camera lens can be mounted with one or more ND filters of different specifications to meet practical photographic requirements, or more particularly to properly reduce the amount of light passing through the lens so that images can be taken either in the illumination of a relatively strong light source or using special photographic skills (e.g., to achieve uniform exposure by waving a black card in front of the lens when taking images in a high-contrast environment). A polarizing filter, on the other hand, is a filter constructed on the principle of polarization of light and includes grate-like crystals arranged in a parallel manner. By rotating a polarizing filter and thus adjusting the angle of its grate-like crystals, the amount of light that has a specific polarization angle and is allowed to pass through the lens can be adjusted. A polarizing filter mounted on a lens can be properly rotated to effectively reduce the reflection in an image (e.g., the reflection from a water surface, a glass display cabinet, or the leaves of a plant), with a view to attaining the desired photographic effect.

Conventionally, an ND filter of a certain specification corresponds to a certain level of transmittance. A photographer, therefore, has to buy and carry ND filters of different specifications with them in order to deal with the light intensities of different shooting environments by mounting the appropriate ND filter(s) to a camera lens. The foregoing approach, however, incurs a huge financial burden on photographers and enormous inconvenience of use, simply considering the trouble of carrying a plurality of ND filters around. In addition, the need to mount and detach ND filters repeatedly compromises the ease of camera operation. Although the conventional polarizing filters can lower light transmittance to some extent, they are not designed specifically for that purpose and hence cannot be directly used as substitutes for ND filters. Furthermore, it is not uncommon that a polarizing filter may have to be used in combination with ND filters of different specifications to cope with the light intensities of different shooting environments.

To overcome the drawbacks described above, the inventor of the present invention developed an "adjustable multiple-ring polarizing ND filter". This adjustable multiple-ring polarizing ND filter is essentially a "three-ring polarizing ND filter assembly" that includes a fixedly connecting ring, a first pivotally connecting ring, and a second pivotally connecting ring. The fixedly connecting ring has one end configured to be fixed to the front rim of a camera lens. The first pivotally connecting ring is fixedly provided therein with a first polarizing lens and has one end pivotally connected to the other end of the fixedly connecting ring. The second pivotally connecting ring is fixedly provided therein with a second polarizing lens and has one end pivotally connected to the other end of the first pivotally connecting ring. Each of the first pivotally connecting ring and the second pivotally connecting ring can be rotated independently with respect to the camera lens so that the first polarizing lens fixedly provided in the first pivotally connecting ring and the second polarizing lens fixedly provided in the second pivotally connecting ring are rotated with respect to each other. That is to say, the polarization angle of each of the first and second polarizing lenses can be adjusted by rotating the corresponding first or second pivotally connecting ring, and the transmittance of incident light can therefore be regulated by changing the included angle between the polarization angles of the polarizing lenses. The single lens set is thus capable of adjusting the amount of light reduction rapidly and effectively for the intended photographic effect. Products adopting this technical solution grabbed the attention of photography enthusiasts immediately after they were launched, with great market responses soon afterward, but the inventor never felt complacent about the "three-ring polarizing ND filter assembly", despite its significant improvement in convenience and utility over various conventional filters. Instead, the inventor still hoped to design an even more convenient and more useful polarizing ND filter assembly to reciprocate the support of those who also take great interest in photography.

The inventor has been not only using the "three-ring polarizing ND filter assembly" personally since its invention, but also sharing his understanding of and experience in photography with fellow-photographers actively. During the process, the inventor has found that, although the "three-ring polarizing ND filter assembly" allows free adjustment of the transmittance of incident light and doubles as a polarizer for screening specific polarized light, most picture-taking environments do not require photographers to adjust the amount of light reduction but require the angle of passage of specific polarized light to be adjusted so that reflection from the surface of an object being photographed (e.g., a water surface, a glass display cabinet, or the leaves of a plant) can be effectively eliminated from the images taken, in order for the images to have the desired photographic effect. When using the "three-ring polarizing ND filter assembly" to adjust the polarization angle, however, it is very likely that the second pivotally connecting ring (or the first pivotally connecting ring) will be inadvertently moved by the user rotating the first pivotally connecting ring (or the second pivotally connecting ring), or that the user will have problem rotating the first pivotally connecting ring and the second pivotally connecting ring stably in unison, the reason being that each of the two pivotally connecting rings is designed to be rotated independently with respect to the camera lens and that the two rings are in close proximity to each other. Should either of the aforesaid scenarios occur, the included angle between the polarization angles of the polarizing lenses will not stay at a fixed value; in other words, the amount of light reduction will not remain at the expected level. The quality and effect of the images taken will be impaired as a result.

The issue to be addressed by the present invention, therefore, is to design an adjustable polarizing ND filter assembly that, in addition to preserving the convenience of the foregoing polarizing ND filter assembly, has two polarizing lenses configured to be rotated stably either in unison with respect to a camera lens so that the polarization angle of the assembly can be adjusted while the amount of light reduction remains constant, or separately with respect to the camera lens so that the amount of light reduction can be easily adjusted and fixed at the desired level, thus effectively enhancing the convenience of use, accuracy, stability, and usefulness of the assembly.

BRIEF SUMMARY OF THE INVENTION

In view of the drawbacks of the conventional photographic filters and the aforesaid polarizing ND filter assembly in terms of cost, portability, and use, the inventor of the present invention incorporated his knowledge obtained from years of work in the related industry and his ample experience as a professional photographer into a design process with continual improvements and finally succeeded in developing an adjustable multiple-ring polarizing ND filter assembly with an elastic engaging member for axial ring securement as disclosed herein. The disclosed assembly is intended to solve all the aforementioned drawbacks at once with greater ease of use, higher accuracy, higher stability, and greater utility so as to serve photography enthusiasts better than its prior art counterparts.

It is an objective of the present invention to provide an adjustable three-ring polarizing ND filter assembly having an elastic engaging member for axial ring securement. The adjustable three-ring polarizing ND filter assembly includes a fixedly connecting ring, a first pivotally connecting ring, a first polarizing lens, a second pivotally connecting ring, and a second polarizing lens. The fixedly connecting ring is a circular ring-shaped frame with a hollow portion and has a first end axially and protrudingly provided with a threadedly connecting ring. The threadedly connecting ring has a radially outer periphery provided with a screw thread configured for threaded connection with a screw thread concavely provided along the front rim of a camera lens so that the first end of the fixedly connecting ring can be threadedly connected, and thereby fixed, to the front rim of the camera lens. The first pivotally connecting ring is also a circular ring-shaped frame with a hollow portion and has a first end pivotally connected to a second end of the fixedly connecting ring. The first pivotally connecting ring further has an opposite second end with an end surface axially and concavely provided with at least one receiving groove. The receiving groove is mounted therein with the elastic engaging member, and the elastic engaging member has a free end that, due to the elasticity of the elastic engaging member, can jut out of the receiving groove and, when subjected to an external force, retract into the receiving groove. The first polarizing lens is fixedly provided in the first pivotally connecting ring and corresponds in position to the hollow portion of the first pivotally connecting ring. The second pivotally connecting ring is a circular ring-shaped frame with a hollow portion too and has a first end pivotally connected to the second end of the first pivotally connecting ring. Moreover, the first end of the second pivotally connecting ring has an end surface that corresponds to the end surface of the second end of the first pivotally connecting ring and that is circumferentially provided with an annular engaging portion. The engaging portion is composed of a plurality of engaging recesses (or teeth) arranged at intervals along the circumference of the second pivotally connecting ring, and the free end of the elastic engaging member can press against the bottom wall of and thus engage with any of the engaging recesses of the engaging portion (or engage between any two adjacent ones of the teeth). The second polarizing lens is fixedly provided in the second pivotally connecting ring and corresponds in position to the hollow portion of the second pivotally connecting ring. As the first pivotally connecting ring and the second pivotally connecting ring are secured together by engagement between the elastic engaging member and one of the engaging recesses (or two adjacent teeth), one who wishes to take pictures in an environment where there is no need to adjust the amount of light reduction can achieve the desired polarizing effect simply by rotating the first pivotally connecting ring or the second pivotally connecting ring because, by so doing, the first pivotally connecting ring and the second pivotally connecting ring will be rotated in unison with respect to the fixedly connecting ring, resulting in simultaneous rotation of the first polarizing lens and the second polarizing lens and hence a different polarizing effect produced jointly by the two polarizing lenses. Conversely, one who wishes to take pictures in an environment where the amount of light reduction needs special adjustment can obtain the desired light-reducing effect by rotating the second pivotally connecting ring with respect to the first pivotally connecting ring because, by so doing, the second polarizing lens will be rotated, i.e., adjusted, with respect to the first polarizing lens. More specifically, by rotating the second pivotally connecting ring with respect to the first pivotally connecting ring, the included angle between the polarization angle of the first polarizing lens and the polarization angle of the second polarizing lens can be adjusted rapidly and effectively, allowing the user to make a significant change to the amount of light reduction and achieve the desired light-reducing effect, typically for coping with the strong lighting of the picture-taking environment. In addition, with the free end of the elastic engaging member in the first pivotally connecting ring in engagement with one of the engaging recesses in the engaging portion of the second pivotally connecting ring (or in engagement between two adjacent teeth on the engaging portion of the second pivotally connecting ring), it is ensured that the desired light-reducing effect will remain stable, i.e., will not change when the assembly is shaken.

Another objective of the present invention is to provide an adjustable double-ring polarizing ND filter assembly having an elastic engaging member for axial ring securement. The adjustable double-ring polarizing ND filter assembly includes a fixedly connecting ring, a first polarizing lens, a first pivotally connecting ring, and a second polarizing lens. The fixedly connecting ring is a circular ring-shaped frame with a hollow portion and has a first end axially and protrudingly provided with a threadedly connecting ring. The threadedly connecting ring has a radially outer periphery provided with a screw thread configured for threaded connection with a screw thread concavely provided along the front rim of a camera lens so that the first end of the fixedly connecting ring can be threadedly connected, and thereby fixed, to the front rim of the camera lens. The fixedly connecting ring has an opposite second end with an end surface axially and concavely provided with at least one receiving groove. The receiving groove is mounted therein with the elastic engaging member, and the elastic engaging member has a free end that, due to the elasticity of the elastic engaging member, can jut out of the receiving groove and, when subjected to an external force, retract into the receiving groove. The first polarizing lens is fixedly provided in the fixedly connecting ring and corresponds in position to the hollow portion of the fixedly connecting ring. The first pivotally connecting ring is also a circular ring-shaped frame with a hollow portion and has a first end pivotally connected to the second end of the fixedly connecting ring. Moreover, the first end of the first pivotally connecting ring has an end surface that corresponds to the end surface of the second end of the fixedly connecting ring and that is circumferentially provided with an annular engaging portion. The engaging portion is composed of a plurality of engaging recesses (or teeth) arranged at intervals along the circumference of the first pivotally connecting ring, and the free end of the elastic engaging member can press against the bottom wall of and thus engage with any of the engaging recesses of the engaging portion (or engage between any two adjacent teeth of the engaging portion). The second polarizing lens is fixedly provided in the first pivotally connecting ring and corresponds in position to the hollow portion of the first pivotally connecting ring. When the first pivotally connecting ring is rotated with respect to the fixedly connecting ring, the second polarizing lens is rotated, and thereby adjusted, with respect to the first polarizing lens such that the first polarizing lens and the second polarizing lens jointly produce a different light-reducing effect, with the free end of the elastic engaging member in the fixedly connecting ring either in engagement with one of the engaging recesses of the engaging portion of the first pivotally connecting ring (or in engagement between two adjacent teeth on the engaging portion of the first pivotally connecting ring) to ensure that this light-reducing effect will be stable, i.e., will not change when the assembly is shaken.

BRIEF DESCRIPTION OF THE SEVERAL VIEWS OF THE DRAWINGS

The objectives, structural features, and effects of the present invention can be more clearly understood by referring to the following detailed description of some illustrative embodiments of the invention in conjunction with the accompanying drawings, in which.

DETAILED DESCRIPTION OF THE INVENTION

Figure 1:
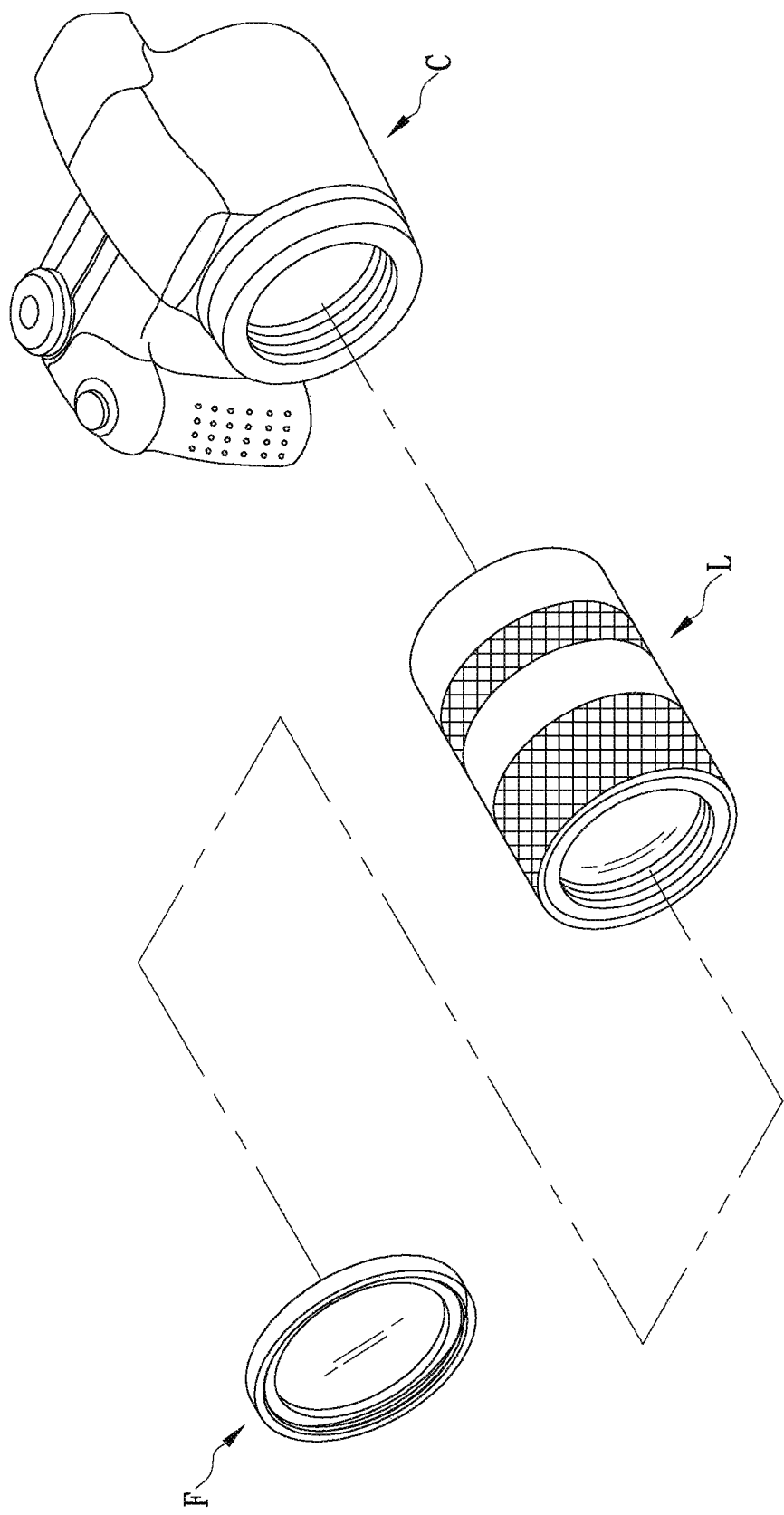
FIG. 1 is an exploded perspective view showing how a conventional polarizing ND filter assembly is applied to a camera.
Figure 2:
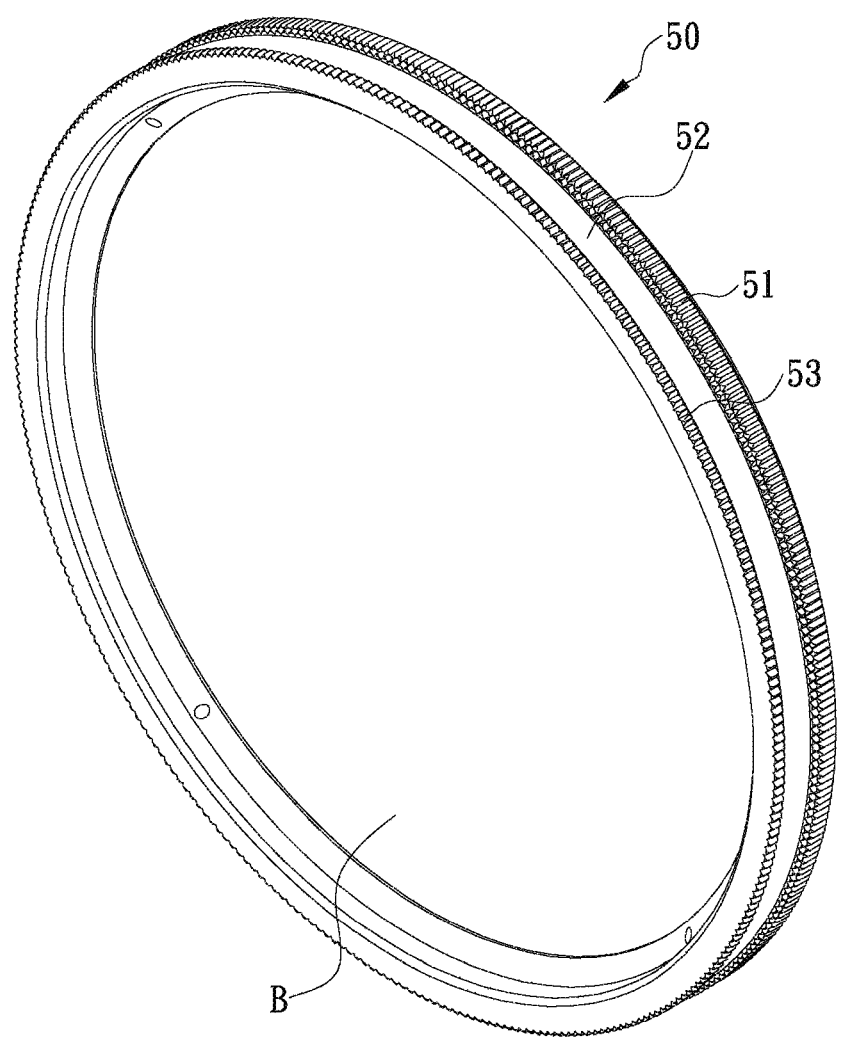
FIG. 2 is an assembled perspective view of the first preferred embodiment of the present invention.
Figure 3:
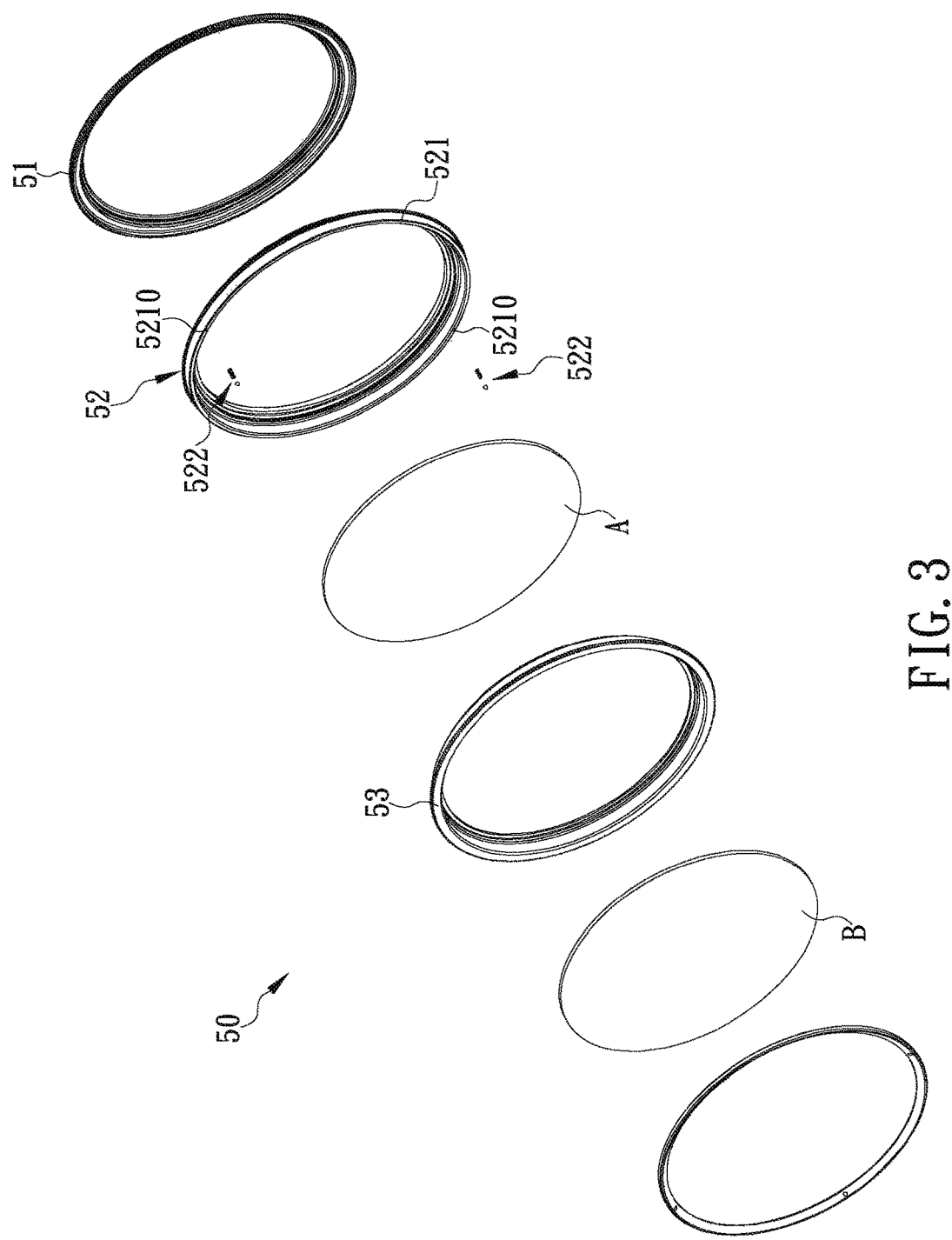
FIG. 3 is an exploded perspective view of the first preferred embodiment of the present invention.
Figure 4:
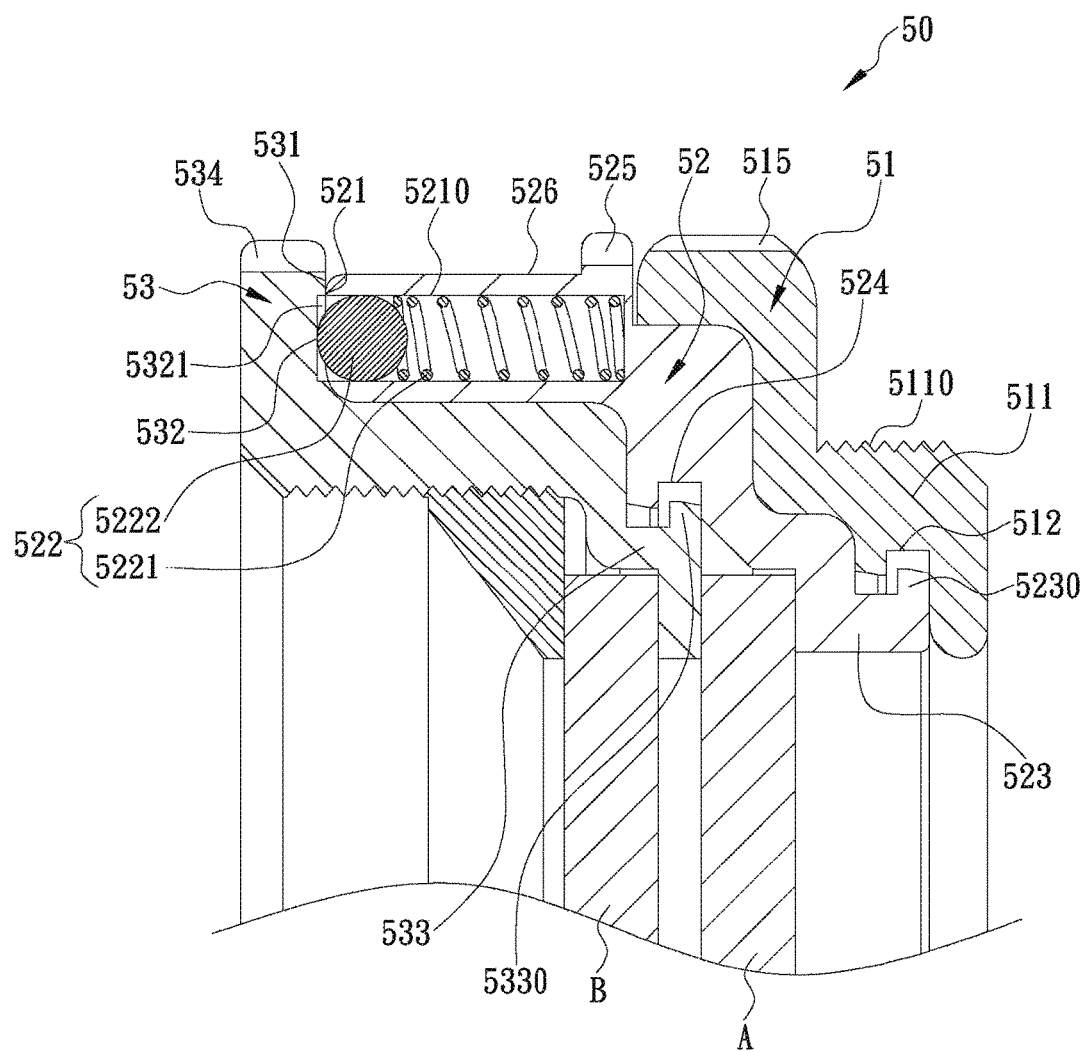
FIG. 4 is a partial sectional view of the first preferred embodiment of the present invention.
Figure 5:
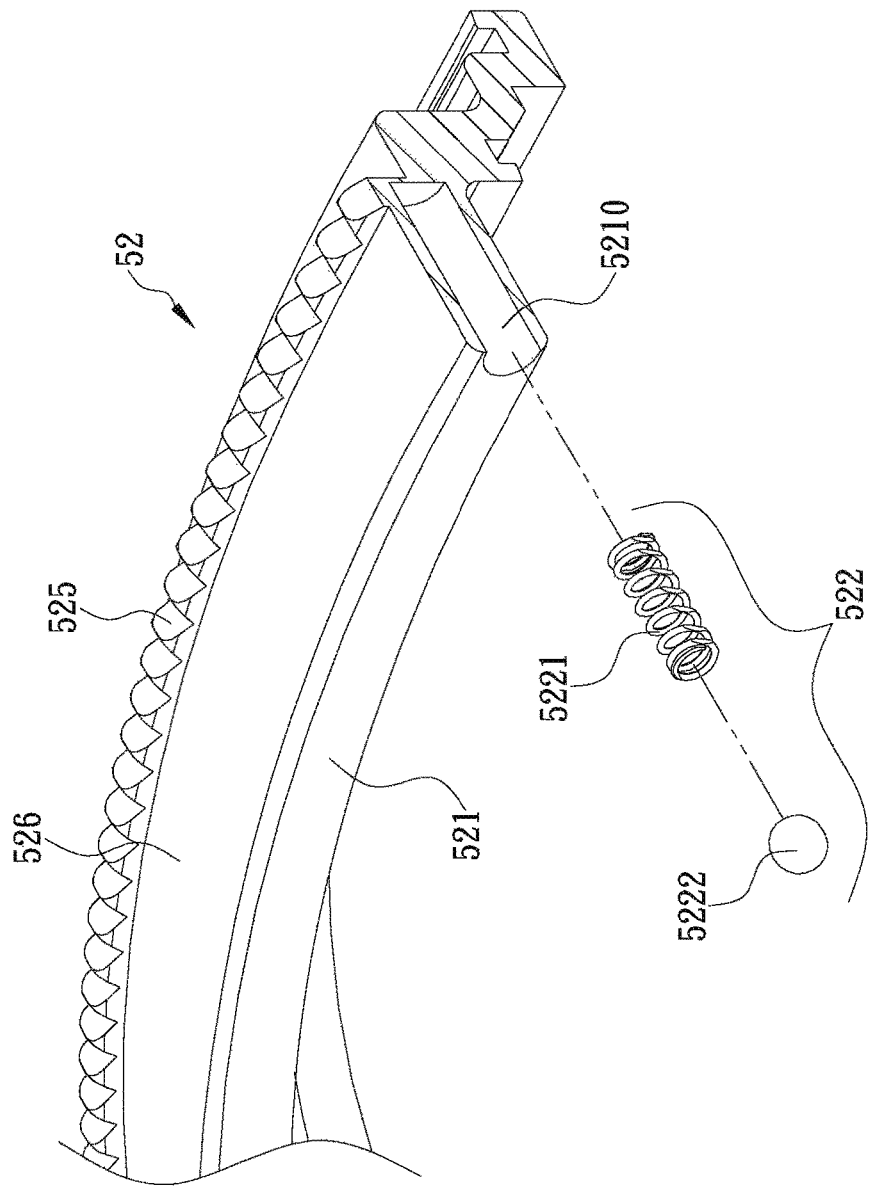
FIG. 5 is a partial view of the first pivotally connecting ring in the first preferred embodiment of the present invention.
Figure 6:
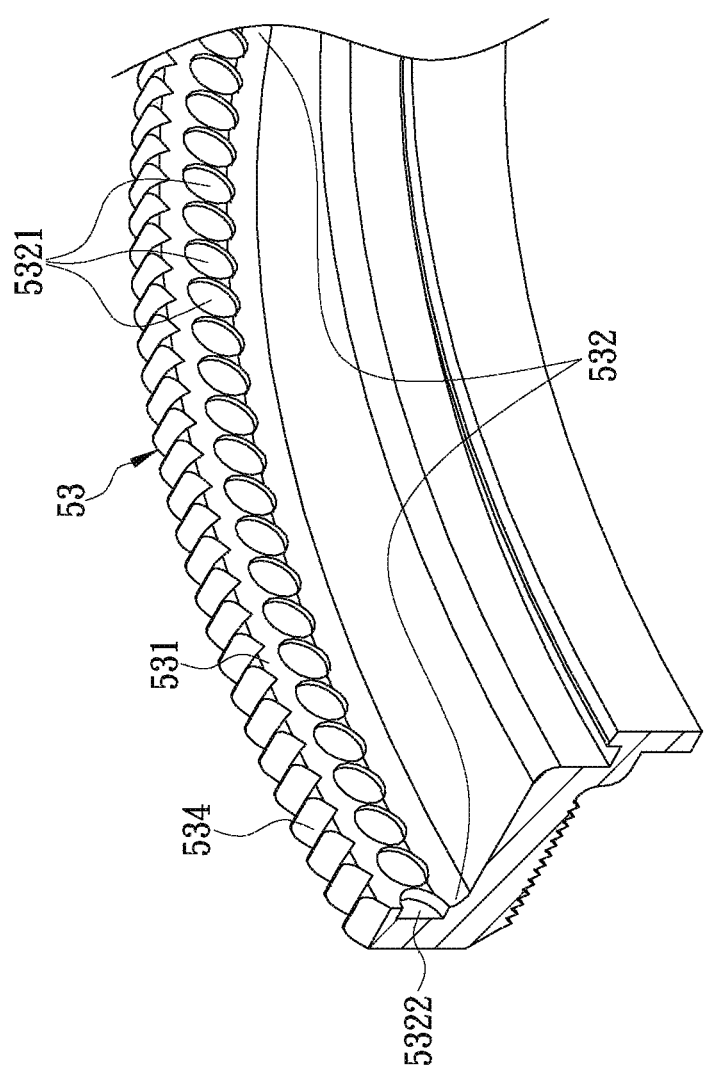
FIG. 6 is a partial view of the second pivotally connecting ring in the first preferred embodiment of the present invention.

Referring to FIG. 2 for the first preferred embodiment of the present invention, an adjustable three-ring polarizing ND filter assembly 50 with an elastic engaging member for axial ring securement is configured to be applied to a camera lens (e.g., the camera lens assembly L shown in FIG. 1) and then mounted to a camera C (as shown in FIG. 1) along with the camera lens assembly L. In the first preferred embodiment, referring to FIG. 2 and FIG. 3, the three-ring polarizing ND filter assembly 50 includes a fixedly connecting ring 51, a first pivotally connecting ring 52, a first polarizing lens A, a second pivotally connecting ring 53, and a second polarizing lens B. As shown in FIG. 3 and FIG. 4, the fixedly connecting ring 51 is a hollow circular ring-shaped frame and is axially and protrudingly provided with a threadedly connecting ring 511 at one end. The radially outer periphery of the threadedly connecting ring 511 is provided with a screw thread 5110. The screw thread 5110 of the threadedly connecting ring 511 is configured for threaded connection with a screw thread concavely provided along the front rim of the camera lens assembly L so that the aforesaid end of the fixedly connecting ring 51 can be threadedly connected, and thereby fixed, to the front rim of the camera lens assembly L. Referring now to FIGS. 3, 4, and 5, the first pivotally connecting ring 52 is also a hollow circular ring-shaped frame and has one end (hereinafter referred to as the first end) pivotally connected in the other end (hereinafter the second end) of the fixedly connecting ring 51. The end surface 521 of the opposite end (hereinafter the second end) of the first pivotally connecting ring 52 is axially and concavely provided with at least one receiving groove 5210 in which an elastic engaging member 522 is mounted. Due to the intrinsic elasticity of the elastic engaging member 522, the free end of the elastic engaging member 522 can extend out of the receiving groove 5210 and, when subjected to an external force, be driven into the receiving groove 5210. The first polarizing lens A is fixedly provided in the first pivotally connecting ring 52 and corresponds in position to the hollow portion of the first pivotally connecting ring 52. Referring to FIGS. 3, 4, and 6, the second pivotally connecting ring 53 is a hollow circular ring-shaped frame too and has one end pivotally connected to the second end of the first pivotally connecting ring 52. The end surface 531 of the aforesaid end of the second pivotally connecting ring 53 corresponds to the end surface 521 of the second end of the first pivotally connecting ring 52 and is circumferentially provided with an annular engaging portion 532. The engaging portion 532 is composed of a plurality of engaging recesses 5321 (or teeth) arranged at intervals along the circumference of the second pivotally connecting ring 53. The free end of the elastic engaging member 522 can press against the bottom wall of and thus engage with any engaging recess 5321 in the engaging portion 532 (or engage between any two adjacent teeth on the engaging portion 532). The second polarizing lens B is fixedly provided in the second pivotally connecting ring 53 and corresponds in position to the hollow portion of the second pivotally connecting ring 53.

In a picture-taking environment where there is no need to adjust the amount of light reduced by the polarizing ND filter assembly 50, a photographer can adjust the polarizing effect of the polarizing ND filter assembly 50, if so desired, by rotating only one of the first pivotally connecting ring 52 and the second pivotally connecting ring 53 because, with the first pivotally connecting ring 52 and the second pivotally connecting ring 53 secured together by engagement between the free end of the elastic engaging member 522 and any of the engaging recesses 5321 (or any two adjacent teeth), the first pivotally connecting ring 52 and the second pivotally connecting ring 53 (and hence the first polarizing lens A and the second polarizing lens B) will be rotated simultaneously with respect to the fixedly connecting ring 51, allowing the polarizing lenses A and B to jointly form a different polarization angle. On the other hand, if pictures are to be taken in an environment where the amount of light reduced by the polarizing ND filter assembly 50 needs particular adjustment, the photographer can achieve the desired light-reducing effect by gripping the first pivotally connecting ring 52 and the second pivotally connecting ring 53 with different hands respectively and then rotating the second pivotally connecting ring 53 with respect to the first pivotally connecting ring 52, for the second polarizing lens B will be rotated, i.e., adjusted, with respect to the first polarizing lens A as a result. By doing so, the photographer can adjust the included angle between the polarization angles of the first polarizing lens A and of the second polarizing lens B rapidly and effectively in order to make a major adjustment to the amount of light reduction, as is often required in a highly illuminated picture-taking environment. Since the free end of the elastic engaging member 522 in the first pivotally connecting ring 52 will engage with one of the engaging recesses 5321 in the engaging portion 532 of the second pivotally connecting ring 53 (or engage between two adjacent teeth on the engaging portion 532 of the second pivotally connecting ring 53) after the adjustment, the desired amount of light reduction will be fixed, i.e., kept from changing when the polarizing ND filter assembly 50 is shaken, thus ensuring stability of the desired light-reducing effect.

In this embodiment, referring to FIG. 4, the inner periphery of the fixedly connecting ring 51 is provided with an engaging groove 512, and the first end of the first pivotally connecting ring 52 is axially and protrudingly provided with a first engaging ring 523, wherein the radially outer periphery of the first engaging ring 523 is provided with a first engaging flange 5230. Thanks to the elasticity and deformability of the first pivotally connecting ring 52 and of the fixedly connecting ring 51, the first engaging flange 5230 and the first engaging groove 512 can engage and pivotally connect with each other, thereby pivotally connecting the first end of the first pivotally connecting ring 52 to the second end of the fixedly connecting ring 51. Please note that the embodiment described above is only a preferred one of the present invention and is not restrictive of the way of implementing the invention. In other embodiments, pivotal connection between the first pivotally connecting ring 52 and the fixedly connecting ring 51 can be carried out differently, regardless of whether the first engaging groove 512 is provided in the inner or outer periphery of the fixedly connecting ring 51 or whether the first engaging flange 5230 is provided on the outer or inner periphery of the first engaging ring 523, provided that the first engaging flange 5230 and the first engaging groove 512 can engage and pivotally connect with each other by virtue of the elasticity and deformability of the first pivotally connecting ring 52 and of the fixedly connecting ring 51.

In the first preferred embodiment, referring to FIGS. 4, 5, and 6, the engaging portion 532 is further concavely provided with a positioning groove 5322. The depth of the positioning groove 5322 is larger than that of the engaging recesses 5321 (or that of the valley between each two adjacent teeth) so that the free end of the elastic engaging member 522 can be positioned in and engage with the positioning groove 5322 to not only secure the second pivotally connecting ring 53 to the first pivotally connecting ring 52, but also maintain the included angle between the polarization angles of the second polarizing lens B and of the first polarizing lens A at a certain value that corresponds to the smallest amount of light reduction, i.e., the highest transmittance of incident light. The smallest amount of light reduction is applicable in most picture-taking environments, where the smallest amount of light reduction needs no adjustment and where the two pivotally connecting rings may be rotated in unison to generate a different polarization angle if so desired, without fear that the smallest amount of light reduction will be changed when the camera is shaken or when the first pivotally connecting ring 52 or the second pivotally connecting ring 53 is operated by accident. Conversely, in the relatively few cases where the lighting in a picture-taking environment is so strong that the smallest amount of light reduction needs adjustment, the photographer only has to disengage the free end of the elastic engaging member 522 from the positioning groove 5322, and the second pivotally connecting ring 53 will be rotatable with respect to the first pivotally connecting ring 52 to enable rapid and effective adjustment of the included angle between the polarization angles of the second polarizing lens B and of the first polarizing lens A, allowing the photographer to change the smallest amount of light reduction significantly in order to accommodate the strong lighting.

In the first preferred embodiment, referring again to FIGS. 4, 5, and 6, the elastic engaging member 522 includes a spring 5221 and a steel ball 5222. The spring 5221 and the steel ball 5222 are placed into the receiving groove 5210 sequentially so that, given the elasticity of the spring 5221, the steel ball 5222 can not only jut out of the receiving groove 5210 (and thus be pressed against the bottom wall of and engage with any engaging recess 5321 in the engaging portion 532, or engage between any two adjacent teeth on the engaging portion 532, or be positioned in and engage with the positioning groove 5322), but also retract into the receiving groove 5210 when subjected to an external force applied by the end surface 531 of the second pivotally connecting ring 53.

In the first preferred embodiment, referring to FIGS. 1, 4, 5, and 6, the radially outer periphery of the fixedly connecting ring 51 is circumferentially provided with a rough surface 515 so that a user can grip the fixedly connecting ring 51 easily with fingers in order to rotate the fixedly connecting ring 51 and thereby secure the fixedly connecting ring 51 to the front rim of the camera lens assembly L. In addition, with a view to enabling independent rotation of the first pivotally connecting ring 52 and the second pivotally connecting ring 53 with respect to each other, and to preventing inadvertent rotation of one of the pivotally connecting rings while the other is being rotated, the radially outer periphery of the first pivotally connecting ring 52 is circumferentially provided with a smooth surface 526 adjacent to the second pivotally connecting ring 53 and a rough surface 525 away from the second pivotally connecting ring 53, and the radially outer periphery of the second pivotally connecting ring 53 is circumferentially provided with a rough surface 534 (or the end of the second pivotally connecting ring 53 that faces away from the first pivotally connecting ring 52 has the rough surface 534 as its end surface), wherein the outer diameter of the second pivotally connecting ring 53 is larger than the diameter of the smooth surface 526 of the first pivotally connecting ring 52, and wherein the diameter of the rough surface 525 of the first pivotally connecting ring 52 is larger than that of the smooth surface 526. Moreover, the second pivotally connecting ring 53 may have a larger inner diameter than the first pivotally connecting ring 52, and the second polarizing lens B may have a larger diameter than the first polarizing lens A, in order for the polarizing ND filter assembly 50 to be mounted to a wide-angle lens (not shown) without causing dark corners in images taken with the wide-angle lens.

Referring to FIGS. 2~6, when it is desired to adjust only the amount of polarization but not the amount of light reduction, the user can do so simply by rotating one of the first pivotally connecting ring 52 and the second pivotally connecting ring 53 while gripping the rough surface 525 or 534 on the outer periphery of that particular ring 52 or 53 with fingers. The first pivotally connecting ring 52 and the second pivotally connecting ring 53 will be rotated simultaneously with respect to the fixedly connecting ring 51 such that the first polarizing lens A and the second polarizing lens B jointly form a different polarization angle. If the steel ball 5222 is positioned in and engages with the positioning groove 5322 during the adjustment, the amount of light reduction will stay at the smallest level while the user adjusts the polarizing effect as appropriate to the shooting environment. If the smallest amount of light reduction needs adjustment, the user can grip the rough surface 525 on the outer periphery of the first pivotally connecting ring 52 with one hand and the rough surface 534 on the outer periphery of the second pivotally connecting ring 53 with the other hand and rotate the second pivotally connecting ring 53 with respect to the first pivotally connecting ring 52 in order to rotate the second polarizing lens B with respect to the first polarizing lens A. By doing so, the user can rapidly adjust the included angle between the polarization angles of the first polarizing lens A and of the second polarizing lens B and thus change the smallest amount of light reduction to a great extent to achieve the desired light-reducing effect. With the steel ball 5222 engaged in one of the engaging recesses 5321 in the engaging portion 532 of the second pivotally connecting ring 53 (or engaged between a pair of adjacent teeth on the engaging portion 532), the amount of light reduction will be fixed at the desired level and will not change even when the polarizing ND filter assembly 50 is shaken; consequently, stability of the desired light-reducing effect is ensured.

Figure 7:
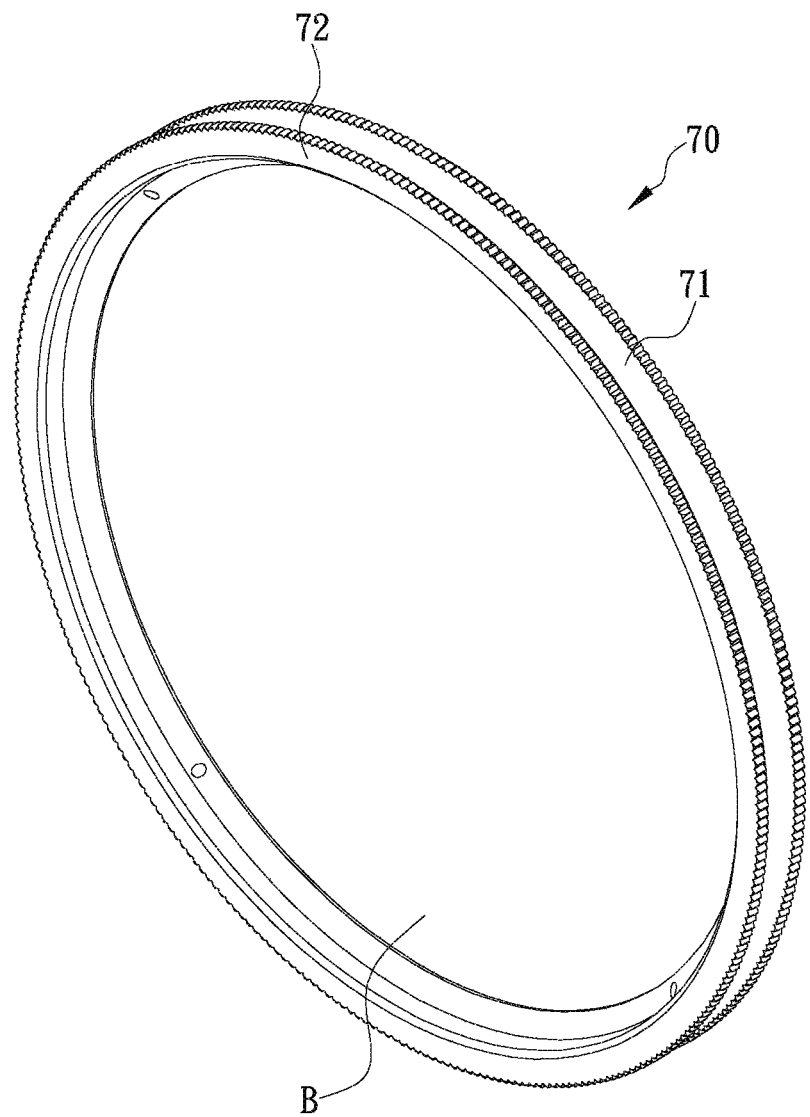
FIG. 7 is an assembled perspective view of the second preferred embodiment of the present invention.
Figure 8:
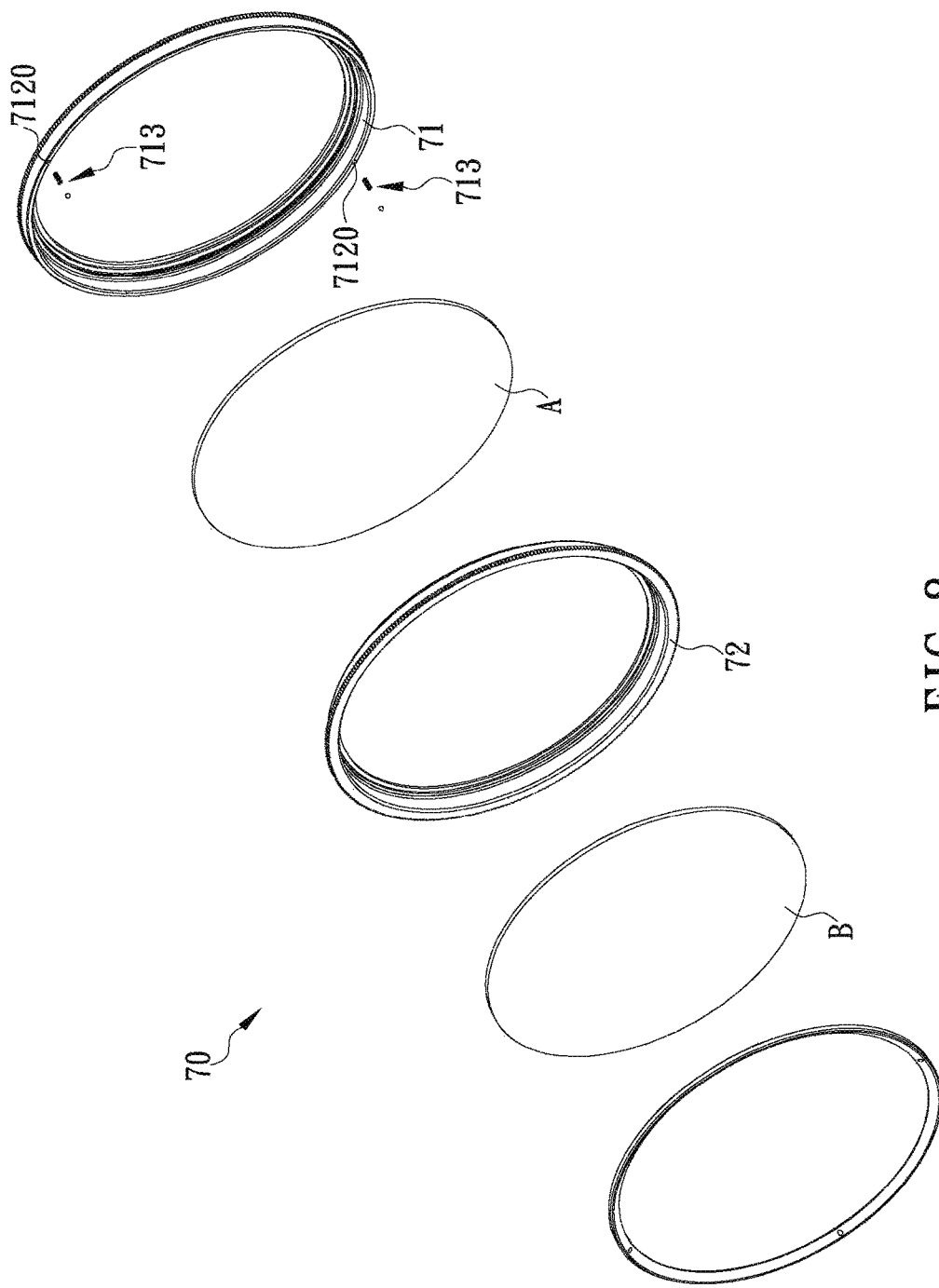
FIG. 8 is an exploded perspective view of the second preferred embodiment of the present invention.
Figure 9:
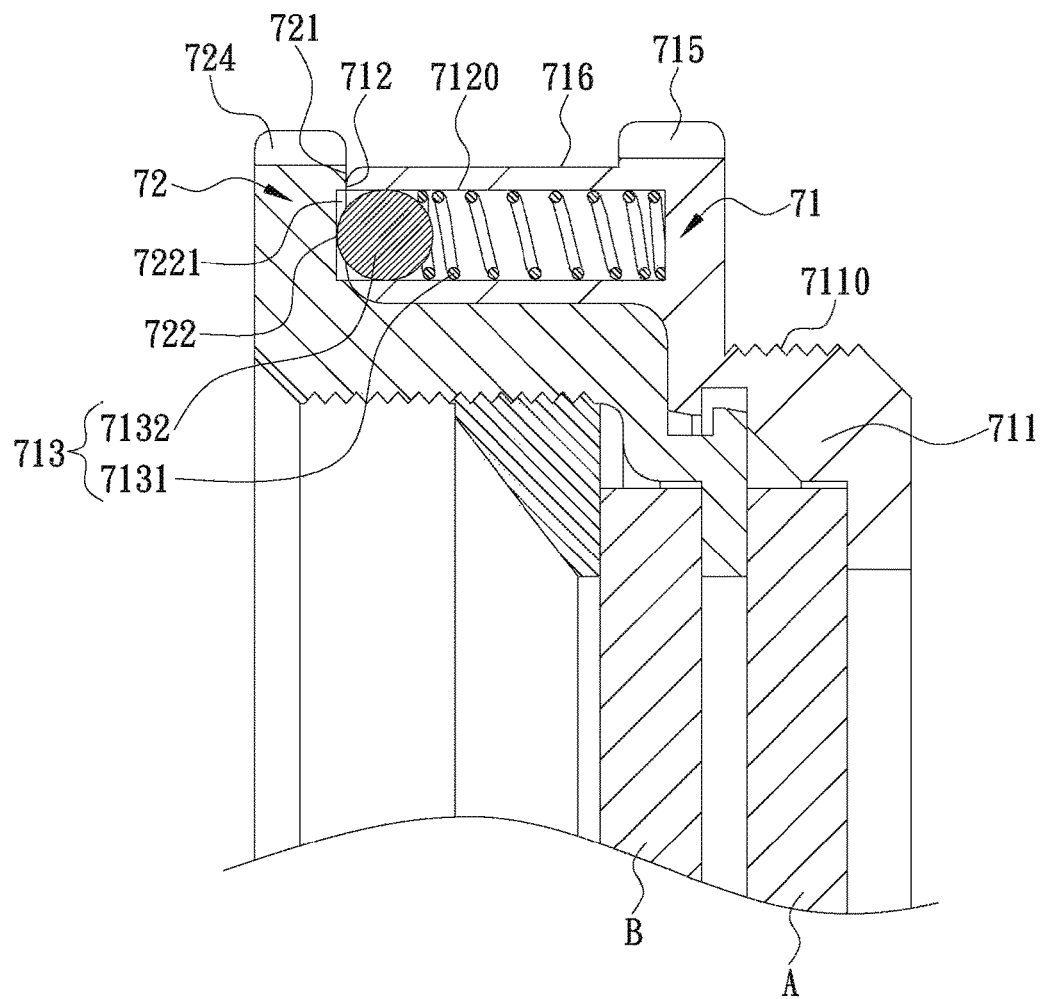
FIG. 9 is a partial sectional view of the second preferred embodiment of the present invention.

FIG. 7 shows the second preferred embodiment of the present invention, or more specifically an adjustable double-ring polarizing ND filter assembly 70 with an elastic engaging member for axial ring securement. As shown in FIG. 8, the adjustable double-ring polarizing ND filter assembly 70 includes a fixedly connecting ring 71, a first polarizing lens A, a first pivotally connecting ring 72, and a second polarizing lens B. Referring to FIG. 9 in conjunction with FIG. 1, the fixedly connecting ring 71 is a hollow circular ring-shaped frame and is axially and protrudingly provided with a threadedly connecting ring 711 at one end. The fixedly connecting ring 71 has a larger outer diameter than the threadedly connecting ring 711. The radially outer periphery of the threadedly connecting ring 711 is provided with a screw thread 7110. The screw thread 7110 of the threadedly connecting ring 711 is configured for threaded connection with a screw thread concavely provided along the front rim of the camera lens assembly L so that the aforesaid end of the fixedly connecting ring 71 can be threadedly connected, and thereby fixed, to the front rim of the camera lens assembly L. The end surface 712 of the other end (hereinafter the second end) of the fixedly connecting ring 71 is axially and concavely provided with at least one receiving groove 7120 in which an elastic engaging member 713 is mounted. Due to the intrinsic elasticity of the elastic engaging member 713, the free end of the elastic engaging member 713 can extend out of the receiving groove 7120 and, when subjected to an external force, be driven into the receiving groove 7120. The first polarizing lens A is fixedly provided in the fixedly connecting ring 71 and corresponds in position to the hollow portion of the fixedly connecting ring 71. The first pivotally connecting ring 72 is also a hollow circular ring-shaped frame and has one end pivotally connected in the second end of the fixedly connecting ring 71. The end surface 721 of the aforesaid end of the first pivotally connecting ring 72 corresponds to the end surface 712 of the second end of the fixedly connecting ring 71 and is circumferentially provided with an annular engaging portion 722. The engaging portion 722 is composed of a plurality of engaging recesses 7221 (or teeth) arranged at intervals along the circumference of the first pivotally connecting ring 72. The free end of the elastic engaging member 713 can press against the bottom wall of and thus engage with any engaging recess 7221 in the engaging portion 722 (or engage between any two adjacent teeth on the engaging portion 722). The second polarizing lens B is fixedly provided in the first pivotally connecting ring 72 and corresponds in position to the hollow portion of the first pivotally connecting ring 72.

In the second preferred embodiment, referring to FIG. 9, rotating the first pivotally connecting ring 72 with respect to the fixedly connecting ring 71 results in rotation, i.e., adjustment, of the second polarizing lens B with respect to the first polarizing lens A, in order for the first polarizing lens A and the second polarizing lens B to jointly produce a different light-reducing effect. As the free end of the elastic engaging member 713 in the fixedly connecting ring 71 is engageable with any engaging recess 7221 (or any two adjacent teeth) of the engaging portion 722 of the first pivotally connecting ring 72, stability of the desired light-reducing effect is ensured; that is to say, the desired amount of light reduction will not change even when the polarizing ND filter assembly 70 is shaken.

In the second preferred embodiment, referring to FIG. 9 in conjunction with FIG. 1, the engaging portion 722 is also concavely provided with a positioning groove (not shown) whose depth is larger than that of the engaging recesses 7221 (or that of the valley between each two adjacent teeth) so that the free end of the elastic engaging member 713 can be positioned in and engage with the positioning groove to not only secure the first pivotally connecting ring 72 to the fixedly connecting ring 71, but also maintain the included angle between the polarization angles of the second polarizing lens B and of the first polarizing lens A at a certain value that corresponds to the smallest amount of light reduction, i.e., the highest transmittance of incident light. The smallest amount of light reduction is applicable in most picture-taking environments, where there is no need to adjust the smallest amount of light reduction. Moreover, the smallest amount of light reduction will not change when the camera is shaken or when the first pivotally connecting ring 72 is operated by accident. In a picture-taking environment where the lighting is so strong that the smallest amount of light reduction needs adjustment, a photographer only has to disengage the free end of the elastic engaging member 713 from the positioning groove, and the first pivotally connecting ring 72 can be rotated with respect to the fixedly connecting ring 71 to enable rapid and effective adjustment of the included angle between the polarization angles of the second polarizing lens B and of the first polarizing lens A, allowing the photographer to make a major adjustment to the smallest amount of light reduction in order to adapt to the strong lighting. The elastic engaging member 713 includes a spring 7131 and a steel ball 7132. The spring 7131 and the steel ball 7132 are placed into the receiving groove 7120 sequentially so that, given the elasticity of the spring 7131, the steel ball 7132 can not only jut out of the receiving groove 7120 (and thus be pressed against and engage with any engaging recess 7221 in the engaging portion 722, or engage between any two adjacent teeth on the engaging portion 722, or be positioned in and engage with the positioning groove), but also retract into the receiving groove 7120 when subjected to an external force applied by the end surface 721 of the first pivotally connecting ring 72. Besides, the radially outer periphery of the fixedly connecting ring 71 in the second preferred embodiment is circumferentially provided with a rough surface 715 to facilitate gripping with fingers, making it easier to rotate the fixedly connecting ring 71 and secure it to the front rim of the camera lens assembly L. In addition, with a view to enabling independent rotation of the first pivotally connecting ring 72 and to preventing inadvertent rotation of the fixedly connecting ring 71 while the first pivotally connecting ring 72 is being rotated, the radially outer periphery of the fixedly connecting ring 71 is circumferentially provided with a smooth surface 716 adjacent to the first pivotally connecting ring 72, and the radially outer periphery of the first pivotally connecting ring 72 is circumferentially provided with a rough surface 724 (or the end of the first pivotally connecting ring 72 that faces away from the fixedly connecting ring 71 has the rough surface 724 as its end surface), wherein the diameter of the smooth surface 716 of the fixedly connecting ring 71 is smaller than that of the rough surface 715, and wherein the outer diameter of the first pivotally connecting ring 72 is larger than the diameter of the smooth surface 716 of the fixedly connecting ring 71.

While the invention herein disclosed has been described by means of specific embodiments, numerous modifications and variations could be made thereto by those skilled in the art without departing from the scope of the invention set forth in the claims.

What is claimed is:

1. An adjustable double-ring polarizing neutral-density (ND) filter assembly with an elastic engaging member for axial ring securement, comprising:
   a fixedly connecting ring configured as a circular ring-shaped frame with a hollow portion, wherein the fixedly connecting ring has a first end axially and protrudingly provided with a threadedly connecting ring, the threadedly connecting ring has a radially outer periphery provided with a screw thread, the screw thread of the threadedly connecting ring is configured for threaded connection with a screw thread concavely provided along a front rim of a camera lens so that the first end of the fixedly connecting ring is threadedly connectable, and thereby fixable, to the front rim of the camera lens, the fixedly connecting ring further has an opposite second end with an end surface axially and concavely provided with at least one receiving groove, the receiving groove is mounted therein with the elastic engaging member, and the elastic engaging member has a free end that, due to elasticity of the elastic engaging member, is able to jut out of the receiving groove and, when subjected to an external force, retract into the receiving groove;
   a first polarizing lens fixedly provided in the fixedly connecting ring and corresponding in position to the hollow portion of the fixedly connecting ring;
   a first pivotally connecting ring configured as a circular ring-shaped frame with a hollow portion, wherein the first pivotally connecting ring has a first end pivotally connected to the second end of the fixedly connecting ring, the first end of the first pivotally connecting ring has an end surface corresponding to the end surface of the second end of the fixedly connecting ring and circumferentially provided with an annular engaging portion, and the engaging portion is composed of a plurality of engaging recesses or teeth arranged at intervals along the circumference of the first pivotally connecting ring so that the free end of the elastic engaging member is able to press against a bottom wall of and thus engage with any of the engaging recesses of the engaging portion or engage between any two adjacent ones of the teeth of the engaging portion; and
   a second polarizing lens fixedly provided in the first pivotally connecting ring and corresponding in position to the hollow portion of the first pivotally connecting ring;
   wherein when the first pivotally connecting ring is rotated with respect to the fixedly connecting ring, the second polarizing lens is rotated, and thereby adjusted, with respect to the first polarizing lens such that the first polarizing lens and the second polarizing lens jointly produce a different light-reducing effect, with the free end of the elastic engaging member in the fixedly connecting ring either in engagement with one of the engaging recesses of the engaging portion of the first pivotally connecting ring or in engagement between two adjacent ones of the teeth of the engaging portion of the first pivotally connecting ring to ensure that the different light-reducing effect is stable and will not change when the adjustable double-ring polarizing ND filter assembly is shaken.

2. The adjustable double-ring polarizing ND filter assembly of claim 1, wherein the fixedly connecting ring has a radially outer periphery circumferentially provided with a rough surface, and the fixedly connecting ring has a larger outer diameter than the threadedly connecting ring.

3. The adjustable double-ring polarizing ND filter assembly of claim 2, wherein the radially outer periphery of the fixedly connecting ring is circumferentially provided with a smooth surface adjacent to the first pivotally connecting ring, and the smooth surface has a smaller diameter than the rough surface of the fixedly connecting ring.

4. The adjustable double-ring polarizing ND filter assembly of claim 3, wherein the first pivotally connecting ring has a radially outer periphery circumferentially provided with a rough surface, and the rough surface of the first pivotally connecting ring has a larger diameter than the smooth surface of the fixedly connecting ring.

5. The adjustable double-ring polarizing ND filter assembly of claim 4, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the first pivotally connecting ring to the fixedly connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable double-ring polarizing ND filter assembly is shaken or when the first pivotally connecting ring is operated by accident; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the first pivotally connecting ring with respect to the fixedly connecting ring.

6. The adjustable double-ring polarizing ND filter assembly of claim 5, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion, engaging between any two adjacent ones of the teeth of the engaging portion, or positioned in and engaging with the positioning groove; and to retract into the receiving groove when subjected to an external force applied by the end surface of the first end of the first pivotally connecting ring.

7. The adjustable double-ring polarizing ND filter assembly of claim 6, wherein the first pivotally connecting ring has a larger inner diameter than the fixedly connecting ring, and the second polarizing lens has a larger diameter than the first polarizing lens.

8. The adjustable double-ring polarizing ND filter assembly of claim 3, wherein the first pivotally connecting ring has an opposite second end with an end surface configured as a rough surface.

9. The adjustable double-ring polarizing ND filter assembly of claim 8, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the first pivotally connecting ring to the fixedly connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable double-ring polarizing ND filter assembly is shaken or when the first pivotally connecting ring is operated by accident; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the first pivotally connecting ring with respect to the fixedly connecting ring.

10. The adjustable double-ring polarizing ND filter assembly of claim 9, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion, engaging between any two adjacent ones of the teeth of the engaging portion, or positioned in and engaging with the positioning groove; and to retract into the receiving groove when subjected to an external force applied by the end surface of the first end of the first pivotally connecting ring.

11. The adjustable double-ring polarizing ND filter assembly of claim 10, wherein the first pivotally connecting ring has a larger inner diameter than the fixedly connecting ring, and the second polarizing lens has a larger diameter than the first polarizing lens.

12. The adjustable double-ring polarizing ND filter assembly of claim 3, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the first pivotally connecting ring to the fixedly connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable double-ring polarizing ND filter assembly is shaken or when the first pivotally connecting ring is operated by accident; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the first pivotally connecting ring with respect to the fixedly connecting ring.

13. The adjustable double-ring polarizing ND filter assembly of claim 12, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion, engaging between any two adjacent ones of the teeth of the engaging portion, or positioned in and engaging with the positioning groove; and to retract into the receiving groove when subjected to an external force applied by the end surface of the first end of the first pivotally connecting ring.

14. The adjustable double-ring polarizing ND filter assembly of claim 13, wherein the first pivotally connecting ring has a larger inner diameter than the fixedly connecting ring, and the second polarizing lens has a larger diameter than the first polarizing lens.

15. The adjustable double-ring polarizing ND filter assembly of claim 2, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the first pivotally connecting ring to the fixedly connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable double-ring polarizing ND filter assembly is shaken or when the first pivotally connecting ring is operated by accident; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the first pivotally connecting ring with respect to the fixedly connecting ring.

16. The adjustable double-ring polarizing ND filter assembly of claim 15, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion, engaging between any two adjacent ones of the teeth of the engaging portion, or positioned in and engaging with the positioning groove; and to retract into the receiving groove when subjected to an external force applied by the end surface of the first end of the first pivotally connecting ring.

17. The adjustable double-ring polarizing ND filter assembly of claim 16, wherein the first pivotally connecting ring has a larger inner diameter than the fixedly connecting ring, and the second polarizing lens has a larger diameter than the first polarizing lens.

18. The adjustable double-ring polarizing ND filter assembly of claim 1, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the first pivotally connecting ring to the fixedly connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable double-ring polarizing ND filter assembly is shaken or when the first pivotally connecting ring is operated by accident; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the first pivotally connecting ring with respect to the fixedly connecting ring.

19. The adjustable double-ring polarizing ND filter assembly of claim 18, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion, engaging between any two adjacent ones of the teeth of the engaging portion, or positioned in and engaging with the positioning groove; and to retract into the receiving groove when subjected to an external force applied by the end surface of the first end of the first pivotally connecting ring.

20. The adjustable double-ring polarizing ND filter assembly of claim 19, wherein the first pivotally connecting ring has a larger inner diameter than the fixedly connecting ring, and the second polarizing lens has a larger diameter than the first polarizing lens.

21. An adjustable three-ring polarizing neutral-density (ND) filter assembly with an elastic engaging member for axial ring securement, comprising:
a fixedly connecting ring configured as a circular ring-shaped frame with a hollow portion, wherein the fixedly connecting ring has a first end axially and protrudingly provided with a threadedly connecting ring, the threadedly connecting ring has a radially outer periphery provided with a screw thread, and the screw thread of the threadedly connecting ring is configured for threaded connection with a screw thread concavely provided along a front rim of a camera lens so that the first end of the fixedly connecting ring is threadedly connectable, and thereby fixable, to the front rim of the camera lens;
a first pivotally connecting ring configured as a circular ring-shaped frame with a hollow portion, wherein the first pivotally connecting ring has a first end pivotally connected to a second end of the fixedly connecting ring, the first pivotally connecting ring further has an opposite second end with an end surface axially and concavely provided with at least one receiving groove, the receiving groove is mounted therein with the elastic engaging member, and the elastic engaging member has a free end that, due to elasticity of the elastic engaging member, is able to jut out of the receiving groove and, when subjected to an external force, retract into the receiving groove;
a first polarizing lens fixedly provided in the first pivotally connecting ring and corresponding in position to the hollow portion of the first pivotally connecting ring;
a second pivotally connecting ring configured as a circular ring-shaped frame with a hollow portion, wherein the second pivotally connecting ring has a first end pivotally connected to the second end of the first pivotally connecting ring, the first end of the second pivotally connecting ring has an end surface corresponding to the end surface of the second end of the first pivotally connecting ring and circumferentially provided with an annular engaging portion, and the engaging portion is composed of a plurality of engaging recesses or teeth arranged at intervals along the circumference of the second pivotally connecting ring so that the free end of the elastic engaging member is able to press against a bottom wall of and thus engage with any of the engaging recesses of the engaging portion or engage between any two adjacent ones of the teeth of the engaging portion; and a second polarizing lens fixedly provided in the second pivotally connecting ring and corresponding in position to the hollow portion of the second pivotally connecting ring;

wherein when the first pivotally connecting ring and the second pivotally connecting ring are rotated in unison with respect to the fixedly connecting ring, the first polarizing lens and the second polarizing lens are rotated in unison to produce a different polarizing effect; and when the second pivotally connecting ring is rotated with respect to the first pivotally connecting ring, the second polarizing lens is rotated, and thereby adjusted, with respect to the first polarizing lens such that the first polarizing lens and the second polarizing lens jointly produce a different light-reducing effect, with the free end of the elastic engaging member in the first pivotally connecting ring either in engagement with one of the engaging recesses of the engaging portion of the second pivotally connecting ring or in engagement between two adjacent ones of the teeth of the engaging portion of the second pivotally connecting ring to ensure that the different light-reducing effect is stable and will not change when the adjustable three-ring polarizing ND filter assembly is shaken.

22. The adjustable three-ring polarizing ND filter assembly of claim 21, wherein the fixedly connecting ring has a radially outer periphery circumferentially provided with a rough surface, and the fixedly connecting ring has a larger outer diameter than the threadedly connecting ring.

23. The adjustable three-ring polarizing ND filter assembly of claim 22, wherein the first pivotally connecting ring has a radially outer periphery circumferentially provided with a rough surface adjacent to the fixedly connecting ring.

24. The adjustable three-ring polarizing ND filter assembly of claim 23, wherein the radially outer periphery of the first pivotally connecting ring is circumferentially provided with a smooth surface away from the fixedly connecting ring, and the smooth surface has a smaller diameter than the rough surface of the first pivotally connecting ring.

25. The adjustable three-ring polarizing ND filter assembly of claim 24, wherein the second pivotally connecting ring has a radially outer periphery circumferentially provided with a rough surface, and the rough surface of the second pivotally connecting ring has a larger diameter than the smooth surface of the first pivotally connecting ring.

26. The adjustable three-ring polarizing ND filter assembly of claim 25, wherein the second pivotally connecting ring has an opposite second end with an end surface configured as a rough surface.

27. The adjustable three-ring polarizing ND filter assembly of claim 22, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the second pivotally connecting ring to the first pivotally connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable three-ring polarizing ND filter assembly is shaken or when the first pivotally connecting ring or the second pivotally connecting ring is operated by accident, the smallest amount of light reduction being applicable in a picture-taking environment where the smallest amount of light reduction does not need adjustment and where therefore the two pivotally connecting rings may be rotated in unison to produce a different polarizing effect if so desired; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the second pivotally connecting ring with respect to the first pivotally connecting ring, in order to make a substantial adjustment to the smallest amount of light reduction to suit the strong lighting in the picture-taking environment.

28. The adjustable three-ring polarizing ND filter assembly of claim 27, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion or engaging between any two adjacent ones of the teeth of the engaging portion, and to retract into the receiving groove when subjected to an external force applied by the end surface of the first end of the second pivotally connecting ring.

29. The adjustable three-ring polarizing ND filter assembly of claim 28, wherein the second pivotally connecting ring has a larger inner diameter than the first pivotally connecting ring, and the second polarizing lens has a larger diameter than the first polarizing lens.

30. The adjustable three-ring polarizing ND filter assembly of claim 23, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the second pivotally connecting ring to the first pivotally connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable three-ring polarizing ND filter assembly is shaken or when the first pivotally connecting ring or the second pivotally connecting ring is operated by accident, the smallest amount of light reduction being applicable in a picture-taking environment where the smallest amount of light reduction does not need adjustment and where therefore the two pivotally connecting rings may be rotated in unison to produce a different polarizing effect if so desired; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the second pivotally connecting ring with respect to the first pivotally connecting ring, in order to make a substantial adjustment to the smallest amount of light reduction to suit the strong lighting in the picture-taking environment.

31. The adjustable three-ring polarizing ND filter assembly of claim 30, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion or engaging between any two adjacent ones of the teeth of the engaging portion, and to retract into the receiving groove when subjected to an external force applied by the end surface of the first end of the second pivotally connecting ring.

32. The adjustable three-ring polarizing ND filter assembly of claim 31, wherein the second pivotally connecting ring has a larger inner diameter than the first pivotally connecting ring, and the second polarizing lens has a larger diameter than the first polarizing lens.

33. The adjustable three-ring polarizing ND filter assembly of claim 24, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the second pivotally connecting ring to the first pivotally connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable three-ring polarizing ND filter assembly is shaken or when the first pivotally connecting ring or the second pivotally connecting ring is operated by accident, the smallest amount of light reduction being applicable in a picture-taking environment where the smallest amount of light reduction does not need adjustment and where therefore the two pivotally connecting rings may be rotated in unison to produce a different polarizing effect if so desired; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the second pivotally connecting ring with respect to the first pivotally connecting ring, in order to make a substantial adjustment to the smallest amount of light reduction to suit the strong lighting in the picture-taking environment.

34. The adjustable three-ring polarizing ND filter assembly of claim 33, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion or engaging between any two adjacent ones of the teeth of the engaging portion, and to retract into the receiving groove when subjected to an external force applied by the end surface of the first end of the second pivotally connecting ring.

35. The adjustable three-ring polarizing ND filter assembly of claim 34, wherein the second pivotally connecting ring has a larger inner diameter than the first pivotally connecting ring, and the second polarizing lens has a larger diameter than the first polarizing lens.

36. The adjustable three-ring polarizing ND filter assembly of claim 25, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the second pivotally connecting ring to the first pivotally connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable three-ring polarizing ND filter assembly is shaken or when the first pivotally connecting ring or the second pivotally connecting ring is operated by accident, the smallest amount of light reduction being applicable in a picture-taking environment where the smallest amount of light reduction does not need adjustment and where therefore the two pivotally connecting rings may be rotated in unison to produce a different polarizing effect if so desired; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the second pivotally connecting ring with respect to the first pivotally connecting ring, in order to make a substantial adjustment to the smallest amount of light reduction to suit the strong lighting in the picture-taking environment.

37. The adjustable three-ring polarizing ND filter assembly of claim 36, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion or engaging between any two adjacent ones of the teeth of the engaging portion, and to retract into the receiving groove when subjected to an external force applied by the end surface of the first end of the second pivotally connecting ring.

38. The adjustable three-ring polarizing ND filter assembly of claim 37, wherein the second pivotally connecting ring has a larger inner diameter than the first pivotally connecting ring, and the second polarizing lens has a larger diameter than the first polarizing lens.

39. The adjustable three-ring polarizing ND filter assembly of claim 26, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the second pivotally connecting ring to the first pivotally connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable three-ring polarizing ND filter assembly is shaken or when the first pivotally connecting ring or the second pivotally connecting ring is operated by accident, the smallest amount of light reduction being applicable in a picture-taking environment where the smallest amount of light reduction does not need adjustment and where therefore the two pivotally connecting rings may be rotated in unison to produce a different polarizing effect if so desired; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the second pivotally connecting ring with respect to the first pivotally connecting ring, in order to make a substantial adjustment to the smallest amount of light reduction to suit the strong lighting in the picture-taking environment.

40. The adjustable three-ring polarizing ND filter assembly of claim 39, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion or engaging between any two adjacent ones of the teeth of the engaging portion, and to retract into the receiving groove when subjected to an external force applied by the end surface of the first end of the second pivotally connecting ring.

41. The adjustable three-ring polarizing ND filter assembly of claim 40, wherein the second pivotally connecting ring has a larger inner diameter than the first pivotally connecting ring, and the second polarizing lens has a larger diameter than the first polarizing lens.

42. The adjustable three-ring polarizing ND filter assembly of claim 21, wherein the engaging portion is further concavely provided with a positioning groove; the positioning groove has a larger depth than the engaging recesses or a valley between each two adjacent ones of the teeth in order for the free end of the elastic engaging member to be positioned in and engage with the positioning groove, thereby securing the second pivotally connecting ring to the first pivotally connecting ring, maintaining an included angle between a polarization angle of the second polarizing lens and a polarization angle of the first polarizing lens at a value that corresponds to a smallest amount of light reduction and hence a highest transmittance of incident light, and keeping the smallest amount of light reduction from changing when the adjustable three-ring polarizing ND filter assembly is shaken or when the first pivotally connecting ring or the second pivotally connecting ring is operated by accident, the smallest amount of light reduction being applicable in a picture-taking environment where the smallest amount of light reduction does not need adjustment and where therefore the two pivotally connecting rings may be rotated in unison to produce a different polarizing effect if so desired; and when the smallest amount of light reduction needs adjustment to cope with strong lighting in a picture-taking environment, the included angle between the polarization angle of the second polarizing lens and the polarization angle of the first polarizing lens is rapidly and effectively adjustable by disengaging the free end of the elastic engaging member from the positioning groove and rotating the second pivotally connecting ring with respect to the first pivotally connecting ring, in order to make a substantial adjustment to the smallest amount of light reduction to suit the strong lighting in the picture-taking environment.

43. The adjustable three-ring polarizing ND filter assembly of claim 42, wherein the elastic engaging member comprises a spring and a steel ball, and the spring and the steel ball are sequentially placed into the receiving groove so that, due to elasticity of the spring, the steel ball is able to jut out of the receiving groove, thus pressed against the bottom wall of and engaging with any of the engaging recesses of the engaging portion or engaging between any two adjacent ones of the teeth of the engaging portion, and to retract into the receiving groove when subjected to an external force applied by the end surface of the first end of the second pivotally connecting ring.

44. The adjustable three-ring polarizing ND filter assembly of claim 43, wherein the second pivotally connecting ring has a larger inner diameter than the first pivotally connecting ring, and the second polarizing lens has a larger diameter than the first polarizing lens.

* * * * *